United States Patent Office 3,026,203
Patented Mar. 20, 1962

3,026,203
SILVER HALIDE PHOTOGRAPHIC EMULSIONS CONTAINING LINEAR POLYAMINE SENSITIZING AGENTS
Vaughan Crandall Chambers, Jr., Fair Haven, N.J., and Adolf Eduard Oberth, Orangevale, Calif., assignors to E. I. du Pont de Nemours and Company, Wilmington, Del., a corporation of Delaware
No Drawing. Filed Aug. 17, 1959, Ser. No. 833,963
8 Claims. (Cl. 96—107)

This invention relates to radiation-sensitive silver halide emulsions of increased sensitivity. It further relates to radiation-sensitive silver halide emulsions sensitized with a new class of non-optical amine sensitizers.

It is known in the art that aliphatic polyamines, particularly those of the polyethylene polyamine type, are useful chemical sensitizers for silver halide emulsions. It has now been found, however, that unexpectedly superior chemical sensitizers can be obtained by converting the primary amino end groups of the above mentioned aliphatic polyamines into secondary amine groups by substitution of alkyl, aryl, aralkyl, substituted alkyl and substituted aryl groups. When used as chemical sensitizers in photographic emulsions the secondary amines have been found to have advantages over the corresponding primary amines, the former being more active and producing less fog.

An object of this invention is to provide new means for increasing the sensitivity and speed of colloid-silver halide emulsions. Another object is to provide colloid-silver halide emulsions of enhanced sensitivity and speed utilizing available or readily synthesized chemical compounds. Still other objects will appear hereinafter.

These and other objects are attained by the present invention which is a colloid-silver halide photographic emulsion containing sensitizing amounts of at least one linear polyamine in which all the amino groups are secondary amino groups and are linked by substituted or unsubstituted hydrocarbon chains from 2 to 3 carbon atoms in length.

In the preferred embodiment of this invention a linear polyamine as previously described is dissolved to form an aqueous or alcoholic solution, ranging in concentration from 0.01% to 0.1%. To a suspension in a colloid binder of ripened and washed photographic silver halide grains containing gold and sulfur sensitizers of the type and concentration known to those skilled in the art is added a volume of the linear polyamine solution described above such that the amine will be present in the amount of 1 mg. to 50 mg. per mole of silver halide. The sensitized suspension is then subjected to a heat treatment known as "digestion" (or "after-ripening") after which are added the usual post-digestion adjuvants, e.g., antifoggants, wetting agents, halide solutions, etc., the suspension then being coated on a suitable support. The coating is dried, given a sensitometric exposure through a neutral density wedge, processed by developing, fixing, etc., and the image densities read on a conventional type of densitometer. When compared with similarly treated coatings (controls) which contained no linear polyamines a considerable increase in sensitivity was observed.

Three of the amine sensitizers used in the following examples contain primary amino groups, are not within the scope of this invention, and merely serve as controls. These three compounds, all commercially available, are: triethylenetetramine, diethylenetriamine and ethylenediamine.

The following amine sensitizers do fall within the scope of this invention and their source, preparation or reference to preparation is given below:

N,N'''-dimethyltriethylenetetramine was prepared by the reduction of N,N'-ethylenebis(α-methylaminoacetamide) with lithium aluminum hydride in anhydrous tetrahydrofuran. The product had B.P. 152°/17 mm., $n_D^{25°}$ 1.4718, neutralization equivalent 58.9 (theory 58.0).

Analysis.—Calcd. for $C_8H_{22}N_4$: C, 55.13; H, 12.72; N, 32.15. Found: C, 55.12; H, 12,64; N, 32.03. The N,N'-ethylenebis(α-methylaminoacetamide) was prepared by the reaction of N,N'-ethylenebis(α-chloroacetamide) with methylamine. The product had M.P. 121.5–122° C.

Analysis.—Calcd. for $C_8H_{18}N_4O_2$: C, 47.50; H, 8.97. Found: C, 47.11; H, 8.89. N,N'-ethylenebis(α-chloroacetamide) was prepared by the method of Cottrell and Gill, J. Chem. Soc., 1947, 129.

N,N''-dimethyldiethylenetriamine was prepared by the hydrolysis of the tri-p-toluenesulfonamide derivative in aqueous sulfuric acid. The product was isolated as the trihydrochloride, M.P. 277° C. (dec.), neutralization equivalent 241 (theory 240.5).

Analysis.—Calcd. for $C_6H_{20}N_3Cl_3$: C, 29.95; H, 8.38. Found: C, 30.25; H, 8.67. The tri-p-toluenesulfonamide of the product was prepared by alkylation of the symmetrical tri-p-toluenesulfonamide derivative of diethylenetriamine with dimethyl sulfate in aqueous alkali and alcohol. The product had M.P. 152–153.5° C. Analysis.—Calcd. for $C_{27}H_{35}N_3O_6S_3$: C, 54.61; H, 5.94. Found: C, 54.60; H, 6.08. The tri-p-toluenesulfonamide derivative of diethylenetriamine has been reported by Peacock and Dutta, J. Chem. Soc., 1934, 1303.

N,N'-diphenylethylenediamine is commercially available from Distillation Products Industries.

N,N'-dimethylethylenediamine was prepared as described by Schneider, Ber. 28, 3074 (1895).

N,N'-dibenzylethylenediamine was prepared as described by Mengiani and Bernabei, Boll. Chim. Farm. 93, 359 (1954).

N,N'-di-n-butylethylenediamine was prepared as described by Zienty, J. Am. Chem. Soc., 68, 1388 (1946).

N,N'-dimethyltrimethylenediamine was prepared as described by Gibson et al., J. Chem. Soc., 1942, 168.

N,N'-dimethyl-1,2-propanediamine was prepared by the method employed in the synthesis of the corresponding ethylenediamine derivatives. The intermediate dibenzenesulfonamide of 1,2-propanediamine melted at 144–5° C. The dibenzenesulfonamide of the product melted at 104–5° C. N,N'-dimethyl-1,2-propanediamine had B.P. 128–129° C., $n_D^{25°}$ 1.4257, neutralization equivalent 52 (theory 51).

*Example I*

A high speed gelatino silver iodobromide emulsion containing 2 moles of silver halide of approximately 1.7 mole percent silver iodide and 98.3 mole percent silver bromide and containing 66 g. gelatin is precipitated and ripened in the conventional manner. The emulsion was coagulated and washed according to the following procedure:

At the end of ripening, 4 liters of cold water were added to the mix, the temperature was lowered to 95° F., and sufficient acetic acid was added to adjust pH to about 6.3. Then there was added with thorough mixing 75 ml. of an 8.8% aqueous solution of a water-soluble, acid soluble partial acetal of polyvinyl alcohol and sodium o-sulfobenzaldehyde. The suspended matter was coagulated by addition of $H_2SO_4$ to lower the pH to the range of 2.0 to 3.0. Then the coagulum was washed twice with approximately 8000-ml. portions of slightly acidified cold water to wash out most of the soluble salts.

A quantity of the thus purified emulsion containing 1.5 moles of silve halide and with approximately 10 g. of gelatin remaining after the washing was added to an aqueous gelatin solution containing 30 g. of gelatin in 2400 ml. of water. On adjusting the pH to 6.3 with NaOH and stirring at 95° F. the coagulation was redispersed. Under constant stirring to avoid settling of the suspended matter, gold and sulfur sensitizers were added in the normal manner and the emulsion was divided into three equal portions, each containing 0.5 mole of silver halide.

Portion A, the control, received, no further chemical sensitization.

To portion B there was added 5 ml. of an alcoholic solution containing 100 milligrams per liter of triethylenetetramine which had been adjusted to pH 6.3. This is a concentration of 1.0 milligram of the amine per mole of silver halide.

To portion C there was added 5 ml. of an alcoholic solution containing 100 milligrams per liter of N,N'''-dimethyltriethylenetetramine which had been adjusted to pH 6.3. This also is a concentration of 1.0 milligram of the amine per mole of silver halide.

The three emulsions were heated to 140° F., digested for 40 min. at 140° F., cooled to 90° F. and bulked up with dry gelatin in an amount to bring about a silver halide: gelatin ratio of 1:1. After addition of the usual post-digestive adjuvants, e.g. antifoggants, wetting agents, halide solution etc., the emulsions were coated and dried in the usual manner on a cellulose triacetate photographic film base to give coating weights of 100 milligrams silver halide per square decimeter.

Film strips from each of these coatings were given the usual type of sensitometric exposure through a square root of two neutral density step wedge according to a procedure based on the American Standard Method for the Sensitometry of Medical X-Ray Films—pH 2.9–1956 and developed for 5 minutes at 68° F. in a solution of the following composition:

|  | G. |
| --- | --- |
| N-methyl-p-aminophenol hydrosulfate | 3.0 |
| Hydroquinone | 9.0 |
| $Na_2SO_3$ | 50.0 |
| $K_2CO_3$ | 50.0 |
| KBr | 4.5 |
| $H_2O$ to make 1 liter. | |

After fixing, washing and drying the film strips, their densities were read on a Western Electric RA–1100C Densitometer, giving the following results:

|  | Speed | Fog |
| --- | --- | --- |
| A (Control) | .24 | .04 |
| B (triethylenetetramine) | .84 | .08 |
| C (N,N'''-dimethyltriethylenetetramine) | .97 | .08 |

Speed is given as the direct reading of optical density at step #11 of the wedge exposure and includes the density due to fog.

*Example II*

An emulsion was made, coagulated, washed, redispersed, treated with gold and sulfur sensitizers and divided into two portions of 0.5 mole each as described in Example I.

Portion A, the control, received no further chemical sensitization.

To portion B there was added 3.3 ml. of an aqueous solution containing 1 g. per liter of N,N''-dimethyldiethylenetriamine which had been adjusted to pH 6.3. This is a concentration of 6.7 milligrams of the amine per mole of silver halide.

The two emulsions were digested, prepared for coating, coated, dried, exposed, processed, and read as in Example I to give the following results:

|  | Speed | Fog |
| --- | --- | --- |
| A (Control) | .25 | .04 |
| B (N,N''-dimethyldiethylenetriamine) | .77 | .08 |

*Example III*

An emulsion was made, coagulated, washed, redispersed, treated with gold and sulfur sensitizers as described in Example I and divided into four portions of 0.5 mole each.

Portion A, the control, received no further chemical sensitization.

To portion B there was added 3.3 ml. of an alcoholic solution containing 1 g. per liter of N,N'-diphenylethylenediamine which had been adjusted to pH 6.3. This is a concentration of 6.7 milligrams of the amine per mole of silver halide.

To portion C there was added 33 ml. of an aqueous solution containing 1 g. per liter of ethylenediamine which had been adjusted to pH 6.3. This is a concentration of 67 milligrams of the amine per mole of the silver halide.

To portion D there was added 3.3 ml. of an aqueous solution containing 1 g. per liter of N,N'-dimethylethylenediamine which had been adjusted to pH 6.3. This is a concentration of 6.7 milligrams of the amine per mole of silver halide.

The four emulsions were digested, prepared for coating, coated, dried, exposed, processed and their densities determined as in Example I to give the following results:

|  | Speed | Fog |
| --- | --- | --- |
| A (Control) | .27 | .05 |
| B (N,N'-diphenylethylenediamine) | .88 | .08 |
| C (Ethylenediamine) | .96 | .51 |
| D (N,N'-dimethylethylenediamine) | 1.12 | .12 |

*Example IV*

Photographic emulsions were made, coated and tested as in Example I in which the control coating, A, had no amine sensitization. Coating B was sensitized with 6.7 milligrams of N,N'-dibenzylethylenediamine per mole of silver halide which had been added to the emulsion as an alcoholic solution containing 1 g. of the amine per liter.

Coating C was sensitized with 6.7 milligrams of N,N'-di-n-butylethylenediamine per mole of silver halide which had been added to the emulsion as an alcoholic solution containing 1 g. of the amine per liter.

Coating D was sensitized with 6.7 milligrams of N,N'-dimethylethylenediamine per mole of silver halide which had been added to the emulsion as an aqueous solution containing 1 g. of the amine per liter.

Sensitometric results were as follows:

|  | Speed | Fog |
| --- | --- | --- |
| A (Control) | 0.73 | 0.09 |
| B (N,N'-dibenzylethylenediamine) | 1.19 | 0.29 |
| C (N,N'-di-n-butylethylenediamine) | 1.01 | 0.18 |
| D (N,N'-dimethylethylenediamine) | 1.00 | 0.12 |

*Example V*

Coatings were made and tested as in Example I in which the control coating, A, had no amine sensitization. Coating B was sensitized with 6.7 milligrams of N,N'-dimethylethylenediamine per mole of silver halide. Coating D was sensitized with 6.7 milligrams of N,N'-dimethyltetramethylenediamine per mole of silver halide. The above mentioned amine sensitizers were added to the emulsion as aqueous solutions containing 1 g. of the amine per liter. Sensitometric results were as follows:

|  | Speed | Fog |
| --- | --- | --- |
| A (Control) | 0.70 | 0.19 |
| B (N,N'-dimethylethylenediamine) | 0.91 | 0.23 |
| C (N,N'-dimethyltrimethylenediamine) | 1.05 | 0.26 |
| D (N,N'-dimethyltetramethylenediamine) | 0.71 | 0.18 |

Notice that this tetramethylene compound used in D causes no sensitometric effect (compare with control). This compound is outside the scope of this invention which is limited to linkage of secondary amino groups by 2 and 3 carbon atom chains.

Example VI

Coatings were made and tested as in Example I in which the control coating, A, had no amine sensitization while coating B was sensitized with 10 milligrams of N,N'-dimethyl-1,2-propanediamine per mole of silver halide which had been added to the emulsion as an aqueous solution containing 1 g. of the amine per liter. Sensitometric results were as follows:

|  | Speed | Fog |
|---|---|---|
| A (Control) | 1.31 | 0.08 |
| B (N,N'-dimethyl-1,2-propanediamine) | 1.51 | 0.12 |

Example VII

A high speed gelatino silver iodobromide emulsion containing 2 moles of silver halide of approximately 1.15 mole percent silver iodide and 99.85 mole percent silver bromide and containing 382 grams gelatin was precipitated and ripened in the conventional manner. The emulsion was set, noodled and washed to remove soluble salts. Later, the emulsion was melted and divided into four equal parts, each of which contained 0.5 mole of silver halide. Each portion received equal amounts of conventional sulfur and gold sensitizers and was then digested for 40 minutes at 140° F. The first portion (A) served as a control emulsion and received no further chemical sensitization. Half-way through the digestion period amine sensitizers as described herein were added to the other portions as follows:

To portion B there was added an aqueous solution containing 1 gram per liter of N,N'-dimethylethylenediamine in such quantity as to result in a concentration of 13.3 milligrams of amine per mole of silver halide.

To portion C was added an aqueous solution containing 0.1 gram per liter of N,N''-dimethyldiethylenetriamine in such quantity as to result in a concentration of 1.67 milligrams of amine per mole of silver halide.

To portion D was added an aqueous solution containing 0.01 gram per liter of N,N'''-dimethyltriethylenetetramine in such quantity as to result in a concentration of 1 milligram of amine per mole of silver halide.

At the end of digestion, the usual post-digestion adjuvants were added and the emulsions were coated on a cellulose triacetate photographic film base and dried in the usual manner to give coating weights of 100 milligrams of silver halide per square decimeter.

Film strips from each of these coatings were sandwiched between calcium tungstate X-ray intensifying screens in a screen cassette and exposed in a General Electric X-ray machine at 71 kvp., 150 milliamps., one-tenth second, 55 inches tube to film distance through a square root of 2 aluminum step wedge and a 1 millimeter aluminum filter. The films were developed for 5 minutes at 68° F. in a metol-hydroquinone high contrast developer. Transmission density readings on a stroboscopic photoelectric densitometer as described by D. R. White, J. Soc. Mot. Pic. Eng., 33, October 1939, p. 403, gave the following results:

|  | Relative Speed | Fog |
|---|---|---|
| A (Control) | 100 | .09 |
| B (N,N'-dimethylethylenediamine) | 120 | .08 |
| C (N,N''-dimethyldiethylenetriamine) | 120 | .10 |
| D (N,N'''-dimethyltriethylenetetramine) | 120 | .08 |

Example VIII

Three moles of a high speed gelatino silver halide emulsion were precipitated, ripened, coagulated and washed as described in Example I except that only 16.7 g. of gelatin per mole of silver halide were present. The washed coagulum was redispersed by high speed agitation at a pH of 6.3 and then a gelatin solution was added to bring the gelatin content to 120 g. per mole of silver halide. Gold and sulfur sensitizers were added in the conventional manner and two identical portions were removed, each containing one mole of silver halide. The first portion received no further chemical sensitization while to the second portion there was added 13.3 ml. of a 0.1% solution of N,N'-dimethylethylenediamine. Each of the two portions above were further divided into four equal parts and digested for different lengths of time (as indicated in the tabular results below) but all at the same temperature of 148° F. No further binder was added but the usual post-digestive adjuvants were added at the end of digestion and the emulsions were coated at pH 6.8 on a cellulose triacetate photographic film base to give a coating weight of 100 milligrams of silver halide per square decimeter. A 30 milligram per square decimeter gelatin abrasion layer was coated over the emulsion layers. After the usual drying procedure, film strips from each of the coatings were given a conventional type of sensitometric exposure through a square root of two neutral density step wedge previously described in Example I and developed for 5 min. at 68° F. in a metol-hydroquinone high contrast developer. After fixing and drying the film strips their densities were read on a Western Electric RA-1100C Densitometer to give the following results:

| Digestion Time-minutes | Without Amine | | With Amine | |
|---|---|---|---|---|
|  | Rel. Speed | Fog | Rel. Speed | Fog |
| 30 |  |  | 120 | .03 |
| 35 |  |  | 120 | .04 |
| 40 | 100 | .02 | 120 | .04 |
| 45 | 100 | .04 | 120 | .04 |
| 50 | 100 | .05 | 110 | .07 |
| 60 | 110 | .07 |  |  |

Relative speed was calculated at a density reading of 0.35 above fog.

Example IX

A high speed gelatino silver halide emulsion containing 4.5 moles of silver halide of approximately 8 mole percent silver iodide and 92 mole percent silver bromide and containing 75 g. of gelatin was precipitated and ripened in the usual manner. The bulked emulsion was then set, noodled and washed to remove soluble salts. Later the emulsion was melted and the usual quantities of conventional gold and sulfur sensitizers were added. At this point, 3 separate portions were divided off, each portion containing 0.15 mole of silver halide. One of these portions received no further chemical sensitization and served as control. The remaining 2 portions each received amine sensitization as indicated in the table below. An identical quantity of a panchromatic optical sensitizing dye was added to each of the three emulsion portions, which were then heated to 137° F. and digested at this temperature for 212 minutes. At the end of digestion the usual post-digestion adjuvants were added and the emulsions were coated on a cellulose triacetate photographic film base and dried in the usual manner to give coating weights of 75 milligrams of silver halide per square decimeter.

Film strips from each of the resulting 3 coatings were given the usual type of sensitometric exposure through a square root of two neutral density step wedge and developed for 7 minutes at 68° F. in a developing solution of the following composition:

Water _____ ml__ 750
N-methyl-p-aminophenol _____ g__ 2
Na₂SO₃ _____ g__ 5
Borax _____ g__ 2
Water to make 1 liter.

After fixing and drying the densities of the film strips were read on a Western Electric RA–1100C Densitometer, giving the following results:

| Amine Sensitizer | Sensitizer Conc.[1] | Rel. Speed[2] | Fog |
|---|---|---|---|
| None | 0 | 210 | .17 |
| N,N'-dimethylethylenediamine | 20 | 230 | .13 |
| Do | 40 | 250 | .12 |

[1] Concentration expressed as milligrams of amine per 1.5 moles of silver halide.
[2] Speed calculated at density reading of 0.20 above fog, arbitrary scale.

Using a similar emulsion, the preceding experiment was repeated except for employing a slightly wider range of amine sensitizer concentration. The same quantity of the panchromatic optical sensitizing dye used in the above experiment was added to each of the four emulsion portions. Results are as follows:

| Amine Sensitizer | Sensitizer Conc.[1] | Rel. Speed[2] | Fog |
|---|---|---|---|
| None | 0 | 230 | .11 |
| N,N'-dimethylethylenediamine | 20 | 230 | .10 |
| Do | 40 | 250 | .11 |
| Do | 60 | 260 | .07 |

[1] Concentration expressed as milligrams of amine per 1.5 moles of silver halide.
[2] Speed calculated at density reading of 0.20 above fog, arbitrary scale.

Using a similar emulsion, the preceding experiment was repeated, except that N,N''-dimethyldiethylenetriamine was used as the amine sensitizer in the concentrations shown in the table below. The same quantity of the panchromatic optical sensitizing dye used in the two preceding experiments was added to each of the four emulsion portions. Results are as follows:

| Amine Sensitizer | Sensitizer Conc.[1] | Rel. Speed[2] | Fog |
|---|---|---|---|
| None | 0 | 300 | .11 |
| N,N''-dimethyldiethylenetriamine | 50 | 350 | .14 |
| Do | 250 | 370 | .15 |
| Do | 1,000 | 350 | .23 |

[1] Concentration expressed as milligrams of amine per 1.5 moles of silver halide.
[2] Speed calculated at density reading of 0.20 above fog, arbitrary scale.

Using a similar emulsion, the preceding experiment was repeated, again using N,N''-dimethyldiethylenetriamine as the amine sensitizer in the concentrations shown in the table below. Also, as shown in the table below, the same quantity of the panchromatic optical sensitizing dye used in the three preceding experiments was used in two of these emulsions but omitted from the remaining three emulsions. Results are as follows:

| Amine Sensitizer | Sensitizer Conc.[1] | Panchromatic Dye | Rel. Speed[2] | Fog |
|---|---|---|---|---|
| None | 0 | Yes | 230 | .15 |
| N,N''-dimethyldiethylenetriamine | 250 | Yes | 370 | .23 |
| None | 0 | No | 100 | .07 |
| N,N''-dimethyldiethylenetriamine | 60 | No | 120 | .06 |
| Do | 250 | No | 140 | .11 |

[1] Concentration expressed as milligrams of amine per 1.5 moles of silver halide.
[2] Speed calculated at density reading of 0.20 above fog, arbitrary scale.

*Example X*

An emulsion was made, coagulated, washed, redispersed, and treated with gold and sulfur sensitizers as described in Example I. The emulsion was divided into three portions, each containing 1.5 moles of silver halide.

To portion A was added 5 ml. of an aqueous solution containing 1 g. per liter of N,N''-dimethyldiethylenetriamine.

To portion B was added 5 ml. of an aqueous solution containing 1 g. per liter of diethylenetriamine.

Portion C, serving as a control, received no further chemical sensitization. The three emulsions were digested for 35 minutes at 145° F. and then cooled to room temperature. Dilute sulfuric acid was added to lower the pH to 4.5 and cause coagulation of the emulsions. After decanting, the supernatant liquid the equivalent of 186 g. of dry gelatin was added to each emulsion in the forms of a 14% (weight to weight) aqueous solution. On adjusting the pH to 6.3 which NaOH and stirring at 95° F., the coagulations were redispersed, the usual post-digestive adjuvants were added, and each of the three emulsions was again divided into three portions, making a total of 9 emulsions containing 0.5 mole of silver halide apiece. These 9 emulsions will be referred to as numbers 1, 2, and 3 (from original portion A), 4, 5, and 6 (from original portion B), and 7, 8, and 9 (from original portion C).

To each of emulsion portions number 1, 4, and 7 were added 267 g. of a 15% (weight to weight) aqueous solution of dextran, having an average molecular weight of 75,000.

To each of emulsion portions number 2, 5, and 8 were added 200 g. of a 20% (weight to weight) aqueous solution of polyvinylpyrrolidone having an average molecular weight of 40,000.

To each of emulsion portions number 3, 6, and 9 were added 267 g. of a 15% (weight to weight) aqueous solution of dextrin, having an average molecular weight of about 10,000.

The 9 emulsions were coated and dried in the usual manner to give coating weights of 103 milligrams of silver halide per square decimeter. Film strips from each of the coatings were exposed, processed and read as in Example I to give the following results in which an "H" following the emulsion number indicates a high intensity exposure while an "L" indicates a low intensity exposure:

| Emulsion and Coating Number | Amine Sensitizer | Added Binder | Speed | Fog |
|---|---|---|---|---|
| 1H | N,N''-dimethyl-diethylenetriamine | dextran | 1.58 | .17 |
| 1L |  |  | 1.49 | .19 |
| 2H | ----do---- | polyvinyl-pyrrolidone | 1.62 | .46 |
| 2L |  |  | 1.59 | .41 |
| 3H | ----do---- | dextrin | 1.25 | .19 |
| 3L |  |  | 1.05 | .18 |
| 4H | diethylenetriamine | dextran | 1.47 | .15 |
| 4L |  |  | 1.27 | .16 |
| 5H | ----do---- | polyvinyl-pyrrolidone | 1.51 | .42 |
| 5L |  |  | 1.47 | .42 |
| 6H | ----do---- | dextrin | .87 | .17 |
| 6L |  |  | 1.03 | .17 |
| 7H | none | dextran | 1.40 | .14 |
| 7L |  |  | 1.23 | .14 |
| 8H | ----do---- | polyvinyl-pyrrolidone | 1.39 | .30 |
| 8L |  |  | 1.33 | .35 |
| 9H | ----do---- | dextrin | 1.07 | .13 |
| 9L |  |  | .93 | .14 |

Speed is given as the direct reading of optical density at step #11 of the wedge exposure and includes the density due to fog.

In the above examples, no data have been given concerning contrast or gamma because, as a general rule, these values were not affected by the amine sensitizers of this invention. Coating weight was the main factor in determining gamma and the average value of gamma for emulsions in the above examples is about 1.3 per hundred milligrams/square decimeter coating weight.

Many polyfunctional secondary amines in addition to those shown in the examples can be used successfully for purposes described in this memorandum. The terminal amino nitrogens may be linked to alkyl, e.g., methyl, ethyl, n-propyl and n-butyl; aryl, e.g., phenyl and naphthyl; aralkyl, e.g., benzyl and β-phenylethyl; substituted alkyl, e.g., β-hydroxyethyl; and substituted aryl groups, e.g., p-methoxyphenyl and p-methylphenyl. From the standpoint of ease of synthesis, symmetrical compounds, i.e., compounds which have the same group attached to both of the terminal amine nitrogen atoms, are preferred. However, unsymmetricaly substituted compounds which fall within the scope of this invention, i.e., compounds in which unlike groups are attached to the two terminal amine nitrogen atoms, also perform satisfactorily. The two and three carbon hydrocarbon chain or chains linking the secondary amino groups may have one or more hydrogen atoms substituted by alkyl, aryl, aralkyl, substituted alkyl or substituted aryl groups.

This invention may apply to silver iodobromide emulsions, silver chloride, silver bromide, silver chlorobromide and mixtures of these types. The polyfunctional secondary amino sensitizers may be added at any time during the digestion of the emulsions, at the start, at the end, or in the middle of the digestion. The emulsions may be coated on any suitable support to make the desired photographic element. Suitable supports include cellulose acetate, other cellulose esters such as cellulose triacetate, cellulose acetate butyrate, cellulose nitrate, cellulose propionate; super polymers, e.g., polyethylene terephthalate, nylon, polyvinyl chloride, poly(vinyl chloride co vinyl acetate) and vinylidene copolymers with vinyl acetate, acrylonitrile, etc.; metal sheets or foils, e.g., aluminum and zinc; and paper including resin-coated and baryta-coated paper; as well as glass plates.

Various sensitizing agents may be used in conjunction with the polyamines of this invention besides gold and sulfur sensitizers, e.g. the polyoxyalkylene ethers disclosed in Blake et al., U.S. Patent 2,400,532, the polyglycols disclosed in Blake et al., U.S. Patent 2,423,539, and combinations of metal salts as taught by Baldsiefen U.S. Patent 2,540,085 and Baldsiefen et al., U.S. Patent 2,540,086. Also, the emulsions may contain any of the antifoggants known to those skilled in the art such as triazoles, nitrobenzimidazoles, mercaptotetrazoles, triazaindenes, etc., as well as the usual hardeners, e.g., chrome alum, formaldehyde, etc. Moreover, any of the hydrophilic or water-permeable colloid binding agents mentioned in Patent 2,400,532 can be used as binding agents in the emulsions of this invention.

An advantage of the invention is that by the addition of one or more of these described polyfunctional secondary amines there is obtained a high degree of non-optical sensitization. Another advantage of the invention is that the emulsions have low fog values. Another advantage of the invention is that the polyamine sensitizing compounds are available or easily synthesized and do not require tedious or involved procedures or complicated apparatus in incorporating them with photographic emulsions.

What is claimed is:

1. A colloid-silver halide photographic emulsion containing at least one linear polyamine sensitizing agent having the general formula:

$$R_1\text{---}[NHR_3]_n\text{---}NHR_2$$

wherein $R_1$ and $R_2$ are selected from the group consisting of alkyl of 1 to 4 carbon atoms, aryl, aralkyl, hydroxy substituted alkyl and alkyl substituted aryl and alkoxy substituted aryl; $R_3$ is an alkylene chain having from 2 to 3 carbon atoms in the chain with each of said carbon atoms having attached thereto members selected from the group consisting of hydrogen, alkyl of 1 to 4 carbon atoms, aryl of 6 to 10 carbon atoms and aralkyl, the alkyl group in said aralkyl being of 1 to 2 carbon atoms; and $n$ is a positive whole number from 1 to 3 and the radical, $NHR_3$, is a unit in the linear chain of the polyamine.

2. An emulsion as set forth in claim 1 wherein said colloid is gelatin.

3. A colloid-silver halide photographic emulsion containing at least one linear polyamine sensitizing agent having the formula: alkyl $(\text{---}NH\text{ alkylene})_n\text{---}NH$ alkyl wherein the alkylene radical contains 2 to 3 carbon atoms, alkyl is a radical of 1 to 4 carbon atoms and $n$ is a positive whole number from 1 to 3.

4. A gold and sulfur sensitized colloid-silver halide photographic emulsion containing from 1 mg. to 50 mg. per mole of silver halide, of at least one polyamine sensitizing agent having the general formula:

$$R_1\text{---}[NHR_3]_n\text{---}NHR_2$$

wherein $R_1$ and $R_2$ are selected from the group consisting of alkyl of 1 to 4 carbon atoms, aryl, aralkyl, hydroxy substituted alkyl and alkyl substituted aryl and alkoxy substituted aryl, $R_3$ is an alkylene chain having from 2 to 3 carbon atoms in the chain with each of said carbon atoms having attached thereto members selected from the group consisting of hydrogen, alkyl of 1 to 4 carbon atoms, aryl of 6 to 10 carbon atoms and aralkyl, the alkyl group in said aralkyl being of 1 to 2 carbon atoms; and $n$ is a positive whole number from 1 to 3 and the radical, $NHR_3$, is a unit in the linear chain of the polyamine.

5. A gold and sulfur sensitized colloid-silver halide photographic emulsion containing from 1 mg. to 50 mg. per mole of silver halide of a N,N'-dimethylethylenediamine sensitizing agent.

6. A gold and sulfur sensitized colloid-silver halide photographic emulsion containing from 1 mg. to 50 mg. per mole of silver halide of a N,N''-dimethyldiethylenetriamine sensitizing agent.

7. A colloid-silver halide photographic emulsion containing a linear amine sensitizing agent having the formula:

$$R_1\text{---}NHR_3\text{---}NHR_1$$

wherein $R_1$ is selected from the group consisting of an alkyl radical of 1 to 4 carbon atoms and hydroxy substituted alkyl and $R_3$ is an alkylene chain having 2 to 3 carbon atoms in the chain with each of said carbon atoms having attached thereto members selected from the group consisting of hydrogen and an alkyl of 1 to 4 carbon atoms.

8. A gelatino-silver halide photographic emulsion containing a linear amine sensitizing agent having the formula:

$$R_1\text{---}NHR_3\text{---}NHR_1$$

wherein $R_1$ is selected from the group consisting of an alkyl radical of 1 to 4 carbon atoms and hydroxy substituted alkyl and $R_3$ is an alkylene chain having 2 to 3 carbon atoms in the chain with each of said carbon atoms having attached thereto members selected from the group consisting of hydrogen and an alkyl of 1 to 4 carbon atoms.

References Cited in the file of this patent

UNITED STATES PATENTS

| | | |
|---|---|---|
| 2,016,471 | Wilmanns et al. | Oct. 8, 1935 |
| 2,518,698 | Lowe et al. | Aug. 15, 1950 |

Notice of Adverse Decision in Interference

In Interference No. 93,906 involving Patent No. 3,026,203, V. C. Chambers, Jr., and A. E. Oberth, SILVER HALIDE PHOTOGRAPHIC EMULSIONS CONTAINING LINEAR POLYAMINE SENSITIZING AGENTS, final judgment adverse to the patentees was rendered June 30, 1966, as to claims 1, 2 and 7.

[*Official Gazette December 13, 1966.*]